United States Patent
Berning et al.

(10) Patent No.: US 9,644,330 B2
(45) Date of Patent: *May 9, 2017

(54) SELF-PROPELLED CONSTRUCTION MACHINE AND METHOD FOR OPERATING A SELF-PROPELLED CONSTRUCTION MACHINE

(71) Applicant: Wirtgen GmbH, Windhagen (DE)

(72) Inventors: Christian Berning, Bruhl (DE); Andreas Vogt, Asbach (DE); Cyrus Barimani, Konigswinter (DE)

(73) Assignee: Wirtgen GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/092,813

(22) Filed: Apr. 7, 2016

(65) Prior Publication Data

US 2016/0356004 A1  Dec. 8, 2016

Related U.S. Application Data

(63) Continuation of application No. 14/461,495, filed on Aug. 18, 2014, now Pat. No. 9,322,139.

(51) Int. Cl.
*E01C 23/088* (2006.01)
*E01C 23/12* (2006.01)
*G01C 5/00* (2006.01)

(52) U.S. Cl.
CPC .......... *E01C 23/088* (2013.01); *E01C 23/127* (2013.01); *G01C 5/00* (2013.01)

(58) Field of Classification Search
CPC .............................. E01C 23/127; E01C 23/088
(Continued)

(56) References Cited

U.S. PATENT DOCUMENTS 4,041,623 A  8/1977  Miller et al.
5,114,267 A  5/1992  Smith et al.
(Continued)

FOREIGN PATENT DOCUMENTS

DE  102006062129 A1  7/2008
DE  102012012397 A1  4/2014
(Continued)

OTHER PUBLICATIONS

European Search Report in corresponding European Patent Application EP 14 18 0581, dated Dec. 12, 2014, 2 pp. (not prior art).

*Primary Examiner* — David Bagnell
*Assistant Examiner* — Michael Goodwin
(74) *Attorney, Agent, or Firm* — Lucian Wayne Beavers; Patterson Intellectual Property Law. PC

(57) ABSTRACT

A self-propelled construction road milling machine, includes a machine frame and a milling drum housing, in which a milling drum is arranged. The machine includes a drive unit with which the height of the scraper blade of a scraper device can be adjusted in relation to the milling drum. A control unit for the drive unit adjusts the height of the scraper blade and a measurement device measures the distance between the lower edge of the scraper blade and the milled material. The control unit is designed in such a way that the scraper blade is height-adjustable depending on the height of the milled material remaining in the milled track. The control unit ensures that, on the one hand, the milled material can come out of the milling drum housing unimpeded behind the milling drum in the direction of work and, on the other hand, that the milling drum housing is shut above the material that is coming out. On the one hand, an unimpeded operation of the milling machine is thus ensured and, on the other hand, a clean result of the work is achieved.

23 Claims, 4 Drawing Sheets

(58) Field of Classification Search
 USPC .................. 299/1.5; 404/84.1, 84.8, 90, 94
 See application file for complete search history.

(56) References Cited

U.S. PATENT DOCUMENTS

| | | |
|---|---|---|
| 7,530,641 B2 | 5/2009 | Berning et al. |
| 8,246,270 B2 | 8/2012 | Berning et al. |
| 8,485,755 B2 | 7/2013 | Menzenbach et al. |
| 8,764,341 B2 | 7/2014 | Menzenbach et al. |
| 8,807,867 B2 | 8/2014 | Berning et al. |
| 2007/0286678 A1 | 12/2007 | Berning et al. |
| 2012/0128419 A1 | 5/2012 | Menzenbach et al. |
| 2012/0286558 A1 | 11/2012 | Berning et al. |
| 2013/0249271 A1 | 9/2013 | Killion |
| 2013/0341996 A1 | 12/2013 | Franzmann et al. |

FOREIGN PATENT DOCUMENTS

| | | |
|---|---|---|
| EP | 1860241 A2 | 11/2007 |
| EP | 1936034 A2 | 6/2008 |
| EP | 2455544 A2 | 5/2012 |

SELF-PROPELLED CONSTRUCTION MACHINE AND METHOD FOR OPERATING A SELF-PROPELLED CONSTRUCTION MACHINE

BACKGROUND OF THE INVENTION

1. Field of the Invention

The invention relates to a self-propelled construction machine, in particular a road milling machine, which has a machine frame and a milling drum housing, inside which a milling drum is arranged. In addition, the invention relates to a method for operating a self-propelled construction machine.

2. Description of the Prior Art

Known road milling machines have a milling drum, with which the material is milled off. The milling drum is arranged inside a milling drum housing, inside which the milled material collects.

The road milling machines have a conveying device, which takes the milled material away from the drum housing in order to load the material onto a transportation vehicle. In addition, the road milling machines have a scraping device, which is provided behind the milling drum in the direction of work. The scraping device has a height-adjustable scraper blade. If the milled material is to be loaded during the work, the lower edge of the scraper blade skims over the milled surface such that the surface is removed cleanly. In the process the scraper blade shuts the milling drum housing behind the milling drum in the direction of work.

If, on the other hand, it is not intended for the milled material to be loaded, it is necessary to raise the scraper blade in relation to the milling drum so that the milled material can remain behind the milling drum housing in the direction of work. Because of the loosening factor, which is approximately 1.2-1.5, the volume of the milled material increases such that the milled channel can only accommodate part of the milled material. The rest of the milled material is thrown out into a heap, which takes on an angle of friction of approximately 30 to 40° at least on the outer flanks. The height of the heap depends inter alia on the depth of milling and the actual loosening factor that occurs.

If the scraper blade has too low a height in this operating mode, the milled material is retained in the milling drum housing such that the milling drum housing fills increasingly with material, which generates additional friction as a result of which the performance is reduced, the wear is increased, and not least it results in higher fuel consumption. On the other hand, the scraper blade cannot be raised arbitrarily either, since otherwise the milling drum housing would be open behind the milling drum in the direction of work as a result of which the milled material does not remain in the milled track in the desired form of a swathe, but rather is spread widely, leading to time-consuming work afterwards.

In practice, the machine operator is forced to move the scraper blade to a relatively wide open position, since he does not have the chance to examine the relevant region in order to adjust the height of the scraper blade precisely due to the arrangement of the individual components of the machine.

Stabilisers and recyclers do not have a conveying device. Therefore, the drum flap of stabilisers and recyclers, which shuts the drum housing, has to be adjusted such that the material can come out of the drum housing.

The object of the invention is to create a self-propelled construction machine, in particular a road milling machine, which can also be operated if the milled material is not loaded but rather is to remain in the milled track. Another object of the invention is to disclose a method for operating a self-propelled construction machine, if the milled material is not loaded but rather remains in the milled track.

These objects are achieved according to the invention with the features of the independent claims. The dependent claims relate to preferred embodiments of the invention.

The construction machine according to the invention, in particular a road milling machine, has a drive unit with which the scraper blade of the scraper device is height-adjustable in relation to the milling drum. In addition, the construction machine according to the invention has a control and/or regulator unit for the drive unit to adjust the height of the scraper blade and a measurement device to measure the distance between at least one reference point, which relates to the lower edge of the scraper blade, and the milled material.

The control and/or regulator unit of the construction machine according to the invention is designed such that the height of the scraper blade is adjusted depending on the height of the milled material remaining in the milled track. The control and/or regulator unit ensures that, on the one hand, the milled material can come out of the milling drum housing behind the milling drum in the direction of work largely unhindered and, on the other hand, the milling drum housing is largely shut above the material coming out of it. Thus, on the one hand, trouble-free operation of the milling machine is ensured and, on the other hand, a clean result of the work is achieved.

In particular, the self-propelled construction machine is a road milling machine, which has a conveying device in particular to convey the milled material from the milling drum housing to a transportation vehicle. The road milling machine can be a front-loader road milling machine, in which case the milled material is loaded via the front of the machine onto an HGV driving in front of it, or a rear-loader road milling machine, in which case the milled material is loaded via the rear onto a heavy goods vehicle (HGV) driving behind it.

A preferred embodiment of the road milling machine provides for an input unit with which two operating modes can be specified. In the process the design of the input unit is irrelevant. For example, the input unit can comprise one or more switches or buttons. It can, however, also be part of a menu navigation system. In the first operating mode, the conveying device is activated and the control and/or regulator unit is deactivated. This is the case if the milled material is to be loaded. If the milled material is not to be loaded, however, but rather is to remain in the milled track, the second operating mode is specified, in which the conveying device is deactivated and the control and/or regulator unit is activated.

A preferred embodiment provides for the control and/or regulator unit to control or regulate the drive unit in such a way that the measured distance between at least one reference point, which relates to the lower edge of the scraper blade, and the milled material corresponds to a specified value or lies within a specified value range. In practice, it is sufficient if a height correction is only performed when the measured distance leaves a specified tolerance range such that corrections to the height setting of the scraper blade are not being performed constantly.

In order to measure the distance between at least one reference point, which relates to the lower edge of the scraper blade, and the milled material, one or more distance measurements can be performed. The distance measurement can relate to one small measurement point (spot measurement) or a larger measurement region (regional measurement) on the surface of the milled material.

The measurement device is preferably designed such that one or more distance measurements are performed outside the milling drum housing behind the scraper blade in the direction of work. In principle, it is also possible, however, to measure the distance inside the milling drum housing.

The measurement device preferably has one or more distance sensors, which are preferably arranged on the rear side of the scraper blade in the direction of work above its lower edge. The distance sensors can be designed in different ways. They can measure the distance in a contactless or tactile manner. For example, the contactless distance sensors can be known ultrasonic distance measurement sensors, inductive, capacitive, optical distance measurement sensors or radar distance measurement sensors. Tactile distance sensors have at least one tactile element, which rests on the milled material.

In the case of a preferred embodiment, the measurement device is designed in such a way that the distance between the surface of the milled material and a reference point, which is not at the height of the lower edge of the scraper blade, is measured with the distance sensor so that the distance sensor does not have to be located directly on or near the lower edge of the scraper blade. A large scope for the arrangement of the distance sensor is thereby created.

In a sectional plane running transverse to the direction of work, the material thrown out behind the milling drum in the direction of work has a characteristic cross section that depends inter alia on the type of milling drum. Milling drums are known, which are characterised in that the material is thrown out in the center of the milling drum housing such that the maximum height of the material that has been thrown out is at its greatest in a region that is roughly central between the left and right-hand edges of the scraper blade and the height of the material falls away towards the sides. It is, however, also possible, for example, for the material to be conveyed inside the milling drum housing to one of the two sides, a cone of rubble again forming, which then lies on the left or right side, however.

In the simplest case, the control and/or regulator provides for the scraper blade to be located above the highest point of the material that is thrown out, it being possible for said point to be at the center or on the right or left side of the milling drum housing depending on the cross section of the material that is thrown out. The remaining gap between the lower edge of the blade and the upper side of the material should then be as small as possible. It is, however, also possible for the control and/or regulator to intentionally provide for the scraper blade to dip into the material at the highest point if the distance between the lower edge of the blade and upper side of the material is not measured at the highest point.

In a preferred embodiment, the measurement device to measure the distance between the lower edge of the scraper blade and the milled material is designed such that the distance measurements are performed at a plurality of reference points, which are located between the left and right-hand edges of the scraper blade in the direction of work. One embodiment provides for the height of the scraper blade to be adjusted depending on the mean value of the measured distances between the respective reference points, which relate to the lower edge of the scraper blade, and the milled material.

A particularly preferred embodiment provides for the height of the scraper blade to be adjusted depending on the smallest or largest measured distance between a reference point, which relates to the lower edge of the scraper blade, and the milled material. If the height of the scraper blade is adjusted depending on the greatest distance, the scraper blade dips deeper into the material at the highest point whereas in the case of the adjustment of the height of the scraper blade depending on the smallest distance, a gap may even remain between the scraper blade and the material.

The type of distance sensor with which the measurement is to be performed can be selected by the vehicle operator. For example, the vehicle operator may select a central distance sensor that measures the smallest distance for the type of milling drum that throws the material out in the center. The selection of the distance sensor can, however, be undertaken by the control and/or regulator unit itself in that during the measurement of the distance, the sensor with which the currently smallest or largest distance is being measured is always used for control/regulation.

If the material that is thrown out has a symmetrical cross section, for example, a particularly preferred embodiment provides for a central measurement in a region that is preferably 50%, in particular 30% of the width of the scraper blade such that a gap remains between the scraper blade and the material.

In the case of a symmetrical cross section, an alternative embodiment provides for the control and/or regulation to be performed in such a way that the scraper blade dips into the material that is thrown out such that the milling drum housing is completely shut behind the milling drum in the direction of work. The scraper blade must not be allowed to dip too deep into the material in the process, however, since otherwise the material would remain inside the milling drum housing. An ideal adjustment is therefore only given when the scraper blade only dips slightly into the center of the material that is thrown out.

The measurement device in this alternative embodiment is designed such that when the cross section is symmetrical, at least one distance measurement is performed at a specified distance to the left-hand edge of the scraper blade in the direction of work and/or at least one distance measurement is performed at a specified distance to the right-hand edge of the scraper blade in the direction of work. The height of the lateral flanks of the material that is thrown out can be determined using these distance measurements. This height is always lower than the height at the center of the material that is thrown out between the left and right-hand edges of the scraper element. For example, the lower edge of the scraper blade can be adjusted to the height of a point on the left and/or right flanks of the material that is thrown out. In this case, the lower edge of the scraper blade dips at the center slightly into the material that has been thrown out.

The specified distance from the left-hand edge and the specified distance from the right-hand edge of the scraper blade can for example be between 0 and 30%, preferably 10 to 20% of the width of the scraper blade, i.e. of the distance between its left and right-hand edges, since the characteristic extension of the flanks occurs here.

BRIEF DESCRIPTION OF THE DRAWINGS

A plurality of embodiments of the invention are described in more detail hereinafter with reference to the drawings, in which.

DETAILED DESCRIPTION

Figure 1:
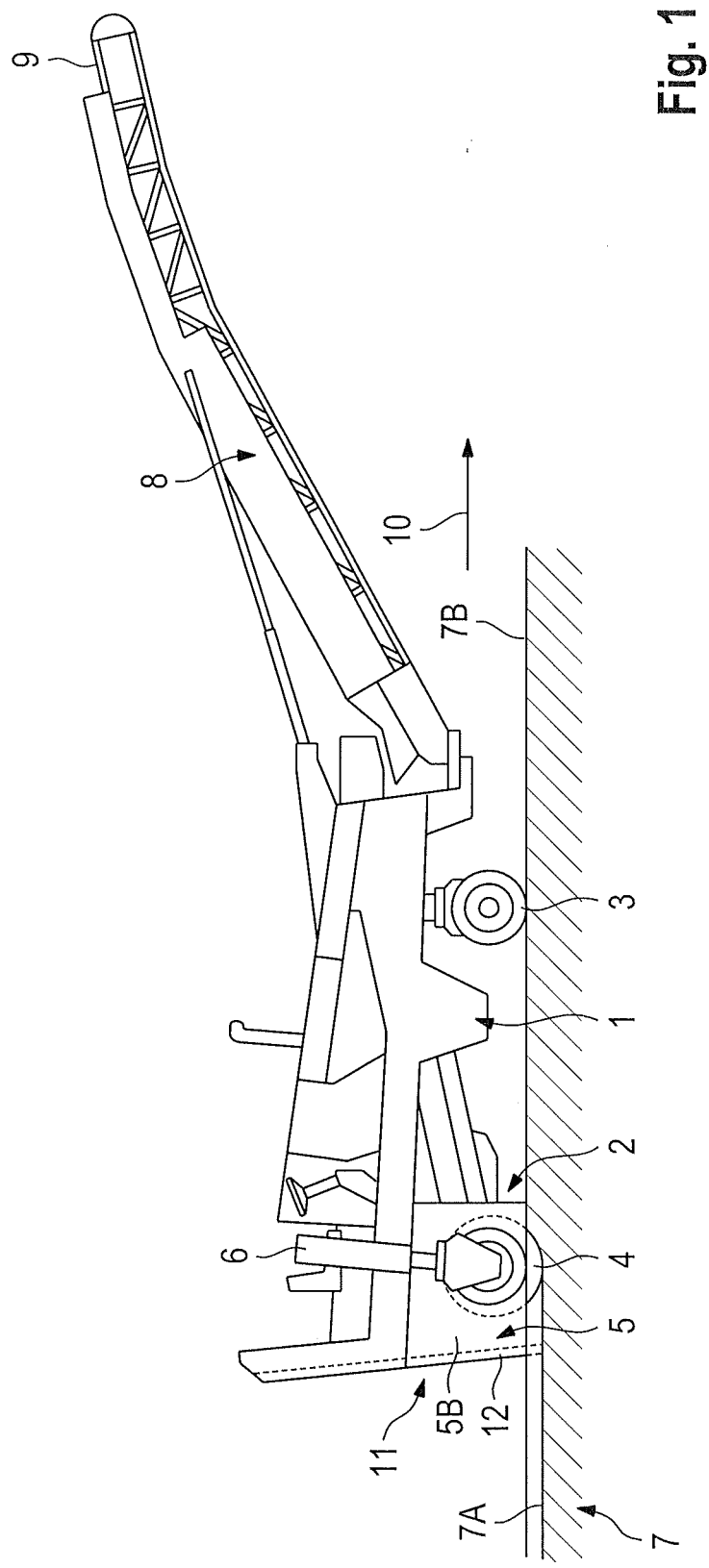
FIG. 1 shows a road milling machine in a side view.

FIG. 1 shows a road milling machine as an example of a self-propelled construction machine. The road milling machine has a machine frame 1 and a chassis 2, which can comprise front and rear ground engaging units 3 which may be crawler tracks or wheels.

The road milling machine has a milling drum 4, which is arranged in a milling drum housing 5 on the machine frame 1. In the present embodiment, the milling drum housing 5 is located at the rear of the machine. The height of the machine frame 1 can be adjusted by means of piston/cylinder arrangements 6 in relation to the surface 7B of the ground 7. By raising or lowering the machine frame 1 in relation to the ground 7, the depth of milling is adjusted.

The milled material can be loaded onto a transport vehicle. For this purpose, the road milling machine has a conveying device 8 with a conveyor belt 9, which conveys the milled material from the milling drum housing 5 to an HGV.

The milling drum housing 5 is shut by lateral plates 5A, 5B on the left and right sides in the direction of work 10, only the right lateral plate 5B in the direction of work being visible in FIG. 1. Behind the milling drum 4 in the direction of work 10 there is a scraper device 11, which has a height-adjustable scraper blade 12, with which the milling drum housing can be shut at the rear.

Figure 2A:
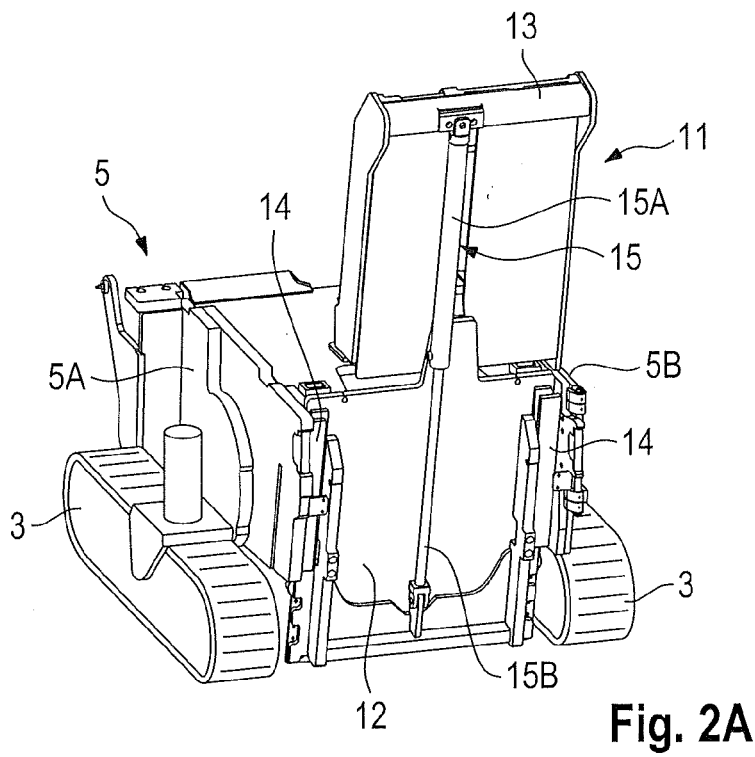
FIG. 2A shows a scraper device of a road milling machine in a perspective view, where the scraper blade is lowered.
Figure 2B:
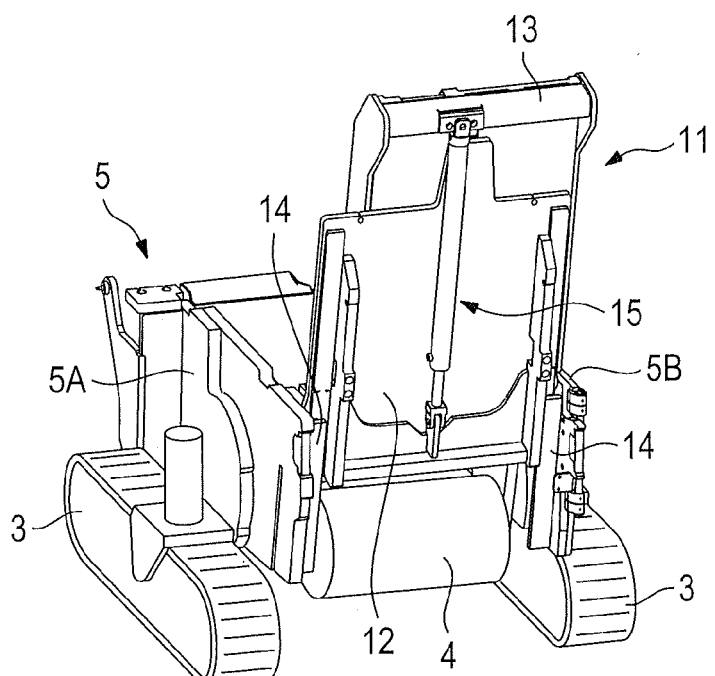
FIG. 2B shows the scraper device from FIG. 2A, where the scraper blade is raised.

FIGS. 2A and 2B show the milling drum housing 5 with the scraper device 11 in a perspective view. The scraper blade 12 is conveyed in lateral guides 14 in a portal 13 on the machine frame 1. The scraper blade can be adjusted so as to be slightly inclined to the ground in the process.

The drive unit to raise and lower the scraper blade has a piston/cylinder arrangement 15, the cylinder 15A of which is fastened in an articulated manner to the portal 13 and the piston 15B of which is fastened in an articulated manner to the scraper blade 12. FIG. 2A shows the scraper blade 12 in the lowered position and FIG. 2B shows it in the raised position.

Figure 3:
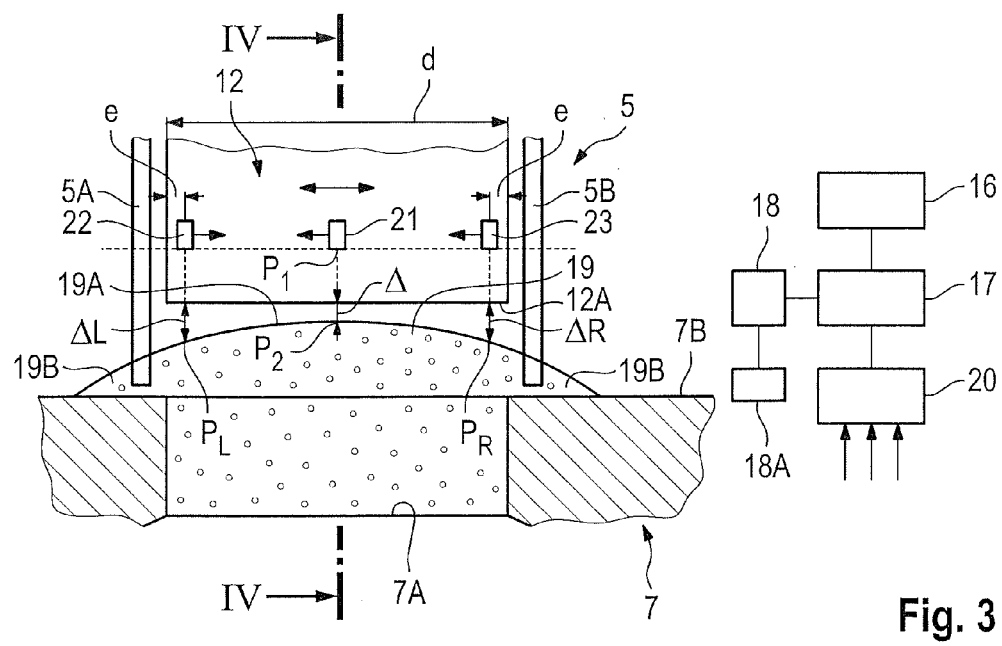
FIG. 3 shows a greatly simplified schematic view of the scraper blade from FIG. 2A and 2B in a view from the rear, the material that has been thrown out having a symmetrical cross section.

The drive unit 16 of the scraper device 11 is controlled or regulated by a control and/or regulator unit 17, which may be a component of the central control and/or regulator unit of the road milling machine (FIG. 3).

The construction and function of the scraper unit 11 are described in detail below with reference to FIGS. 3 to 4.

The road milling machine provides for two operating modes, which can be selected on an input unit 18. In the first operating mode, the conveyor belt 9 of the conveying device 8 of the road milling machine is switched on and the control and/or regulator unit 17 for the drive unit 16 of the scraper unit 11 is switched off, i.e. its particular function is deactivated, the scraper blade 12 being moved downwards such that the lower edge 12A of the scraper blade rests on the surface of the milled ground 7 (FIG. 2A). Consequently the milled surface is scraped off and the milled material is loaded. This is the preferred operating mode of the milling machine. A special control or regulator can be provided for this purpose, which is not subject-matter of the invention, however.

It is also possible, however, to operate the road milling machine in a second operating mode, if it is not intended for the milled material to be totally loaded, but for it to remain at least partially on the surface 7B of the milled ground 7. In the second operating mode, the control and/or regulator unit 17 for the drive unit 16 of the scraper device 11 is activated and the conveying device 8 is deactivated.

Figure 4:
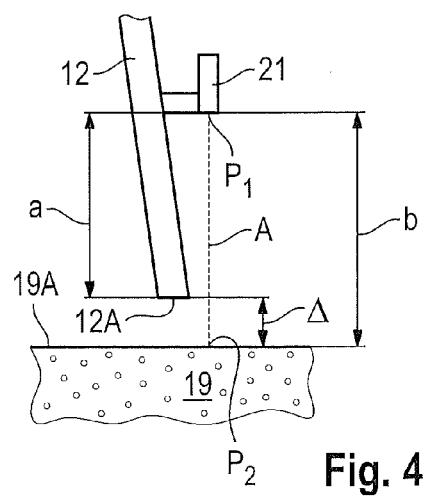
FIG. 4 shows a section through the scraper blade from FIG. 3 along the line IV-IV.

FIGS. 3 and 4 show a greatly simplified schematic view of the construction and function of the scraper device 11 in the second operating mode. FIG. 3 shows the raised scraper blade in a view from the rear with the side plates 5A, 5B, which shut the milling drum housing 5 on the left and right sides in the direction of work 10. When the milling drum housing 5 is open at the rear, the milled material remains lying on the ground. The material that is thrown out has a characteristic contour in a sectional plane extending transverse to the direction of work 10 that depends on the type of milling drum.

Firstly, an embodiment is described where the milling drum 4 throws the material out in the center of the milling drum housing such that the material that is thrown out has a symmetrical cross section. The material 19 that has been thrown out therefore has its greatest height, which depends on the depth of milling and the loosening factor, at the center between the side plates 5A, 5B. On the two sides, the contour has sloping flanks 19B that fall away, the friction angle $\alpha$ of which also depends on the properties of the material. The control and/or regulator unit 17 controls or regulates the drive unit 16 such that the height of the scraper blade 12 can be adjusted optimally in relation to the material that is thrown out. In order to determine the distance between the lower edge 12A of the scraper blade 12 and the surface 19A of the material 19 that is thrown out, a measurement device 20 is provided, which comprises one or more distance sensors 21, 22, 23. The distance sensors can be designed in different ways.

In a first embodiment, the measurement device 20 has a distance sensor 21, which is arranged on the rear of the scraper blade 12 above its lower edge 12A. The height of the distance sensor 21 in relation to the lower edge of the scraper blade is identified by a. The distance sensor 21 measures the distance between a point $P_1$ in the plane of the distance sensor and a point $P_2$, in which the axis A intersects the surface of the material that is thrown out (FIG. 4), in the direction of a preferably vertical axis A.

From the distance b between the points $P_1$ and $P_2$ and the height a of the distance sensor 21 in relation to the lower edge 12A of the scraper blade 12, the measurement device 20 calculates the distance $\Delta$ between the lower edge 12A of the scraper blade 12 and the surface of material 19A. Since the distance sensor 21 is arranged centrally between the two side plates 5A, 5B and between the left and right-hand edges of the scraper blade 12, the measurement is made at the maximum height of the heap in the case of a symmetrical profile.

The control and/or regulator unit 17 controls or regulates the drive unit 16 in such a way that the distance $\Delta$ between the lower edge 12A of the scraper blade 12 and the surface 19A of the milled material 19 corresponds to a specified value or lies within a specified value range. Preferably a height correction is performed if the gap between the lower edge of the scraper blade and the material that is thrown out falls below a specified minimum value in the center between the side plates or exceeds a specified maximum value. If the minimum value is fallen short of the scraper blade is raised and if the maximum value is exceeded the scraper blade is lowered. A spot measurement or regional measurement can be performed with the central distance sensor. The distance $\Delta$ can also be measured with a plurality of distance sensors in the central region, the mean value being established and drawn upon for control and/or regulation.

Because of the characteristic contour of the heap, the distance measurement is preferably performed in a region in the center between the left and right-hand edges of the scraper blade 12, the width of which is 50%, preferably 30% of the width d of the scraper blade.

The control or regulation described above is conditional upon the initially raised scraper blade 12 being lowered or the lowered scraper blade being raised until the distance between the scraper blade and the material corresponds to the specified value or value range, i.e. the scraper blade does not penetrate the material.

An alternative embodiment provides for a slight penetration of the scraper blade 12 into the material such that no gap remains at least in the center between the side plates 5A, 5B. In this embodiment, the measurement device 20 has a right and left distance sensor 22, 23 in the direction of work 10, the left sensor 22 being arranged at a distance e from the left-hand edge and the right sensor 23 at a distance e from the right-hand edge of the scraper blade. The distance e from the left and right-hand edges can, for example, be up to 20% of the width of the scraper blade. Because of the symmetry of the contour of the material that is thrown out, just one left or right distance sensor is sufficient in principle. Establishing the mean value of two distance sensors increases the accuracy of the measurement, however.

In the case of the alternative embodiment, the distance to the points $P_L$ and $P_R$ indicated in FIG. 3, which points are located on the flanks 19B of the material that is thrown out 19, is measured with the two distance sensors 22, 23. In the process the height of the scraper blade 12 is controlled or regulated in such a way that the distance $\Delta_L$ and $\Delta_R$ respectively corresponds to a specified value or value range, which is measured in such a way that the lower edge 12A of the scraper blade 12 dips into the material 19 that is thrown out slightly at the center without, however, touching the flanks 19B of the surface of the material 19A in the region of the measuring points $P_L$ and $P_R$.

The measurement device can have one or more central distance sensors as well as one or more lateral distance sensors, i.e. in the present embodiment all of the distance sensors 21, 22, 23. In an embodiment with a plurality of distance sensors 21, 22, 23, the machine operator can select the distance sensors with which the distance measurement should be performed on the input unit 18. For example, the machine operator can select the central distance sensor 21, which measures the smallest distance, for the control and/or regulation such that a small gap remains between the scraper blade and the material. The machine operator can, however, also select at least one of the two lateral distance sensors 22, 23, which measure a greater distance, for the control and/or regulation such that the scraper blade dips slightly into the material at the center of the heap. The distances measured with the sensors 21, 22, 23 can be displayed on a display unit 18A so that the machine operator can select the respective sensor with no knowledge of the milling drum type.

In another embodiment, the control and/or regulator unit 17 is designed in such a way that the selection of the distance sensors 21, 22, 23 is performed by the control and/or regulator unit itself. The control and/or regulator unit is designed in such a way that the distances measured with all of the sensors are compared to each other, the control and/or regulator unit determining the distance sensor where the smallest or greatest distance is being measured. The control and/or regulator unit then provides for control and/or regulation on the basis of the smallest or greatest distance.

If the milling drum type is entered on the input unit 18, the control and/or regulator unit 17 can extrapolate the cross section of the material that is thrown out such that a selection of the sensor to be used can also be made without comparing the measured distances.

It is also possible to combine the distance measurements in the center and at the flanks of the material that is thrown out with one another. For example, it is possible on the basis of control or regulation to move the scraper blade towards the material surface as far as a specified minimum distance with one distance measurement in the center of the material that is thrown out in order to then transfer to a distance measurement on the flanks of the material that is thrown out in order to adjust the scraper blade to the height of the material surface in the center or to allow it to dip slightly into the material.

Figure 5:
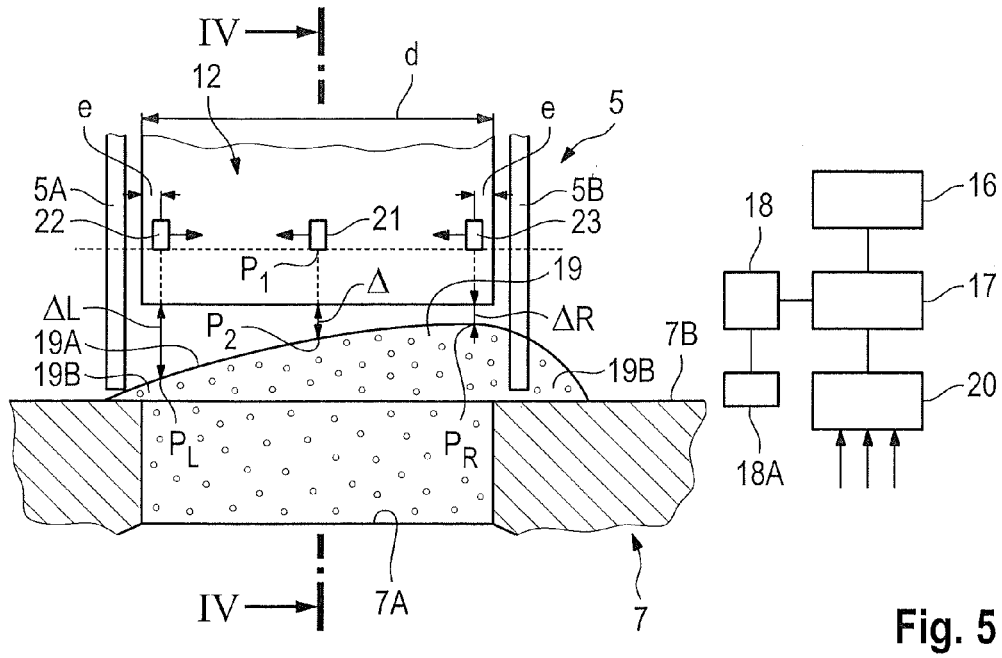
FIG. 5 shows an embodiment where the material that has been thrown out has an asymmetrical cross section.

FIG. 5 shows an embodiment where the material that is thrown out has an asymmetrical cross section, the maximum height of the material being located on the right-hand side. Consequently, the distance measurement is performed with the right-hand distance sensor 23, which measures the smallest distance $\Delta_R$. Again, this can be selected by the machine operator or by the control and regulator unit 17 depending on the milling drum type. The equivalent parts are provided with the same reference numerals. A measurement can, however, also be performed by a plurality of sensors 21, 22, 23, it also being possible to establish the mean value.

Figure 6:
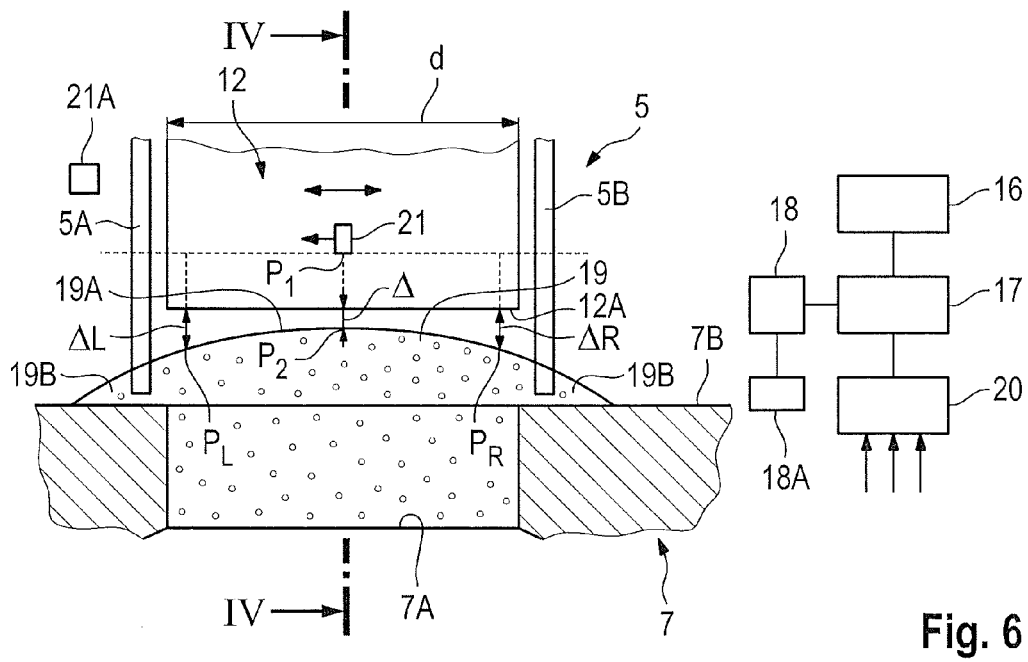
FIG. 6 shows an alternative embodiment with just one distance sensor that is movable transverse to the direction of work.

FIG. 6 shows an embodiment with a measurement device 20, which instead of a plurality of distance sensors only has one sensor 21, which is movable on an axis extending transverse to the direction of work 10 between the side plates 5A and 5B. The equivalent parts are again provided with the same reference numerals. The sensor 21 is mounted in the center for a central distance measurement and it is mounted on one of the two sides for a lateral measurement. The distance sensor can, however, also be moved between the individual positions on a guide.

The invention claimed is:

1. A self-propelled road milling machine, comprising:
   a machine frame;
   a milling drum housing attached to the machine frame;
   a milling drum arranged in the milling drum housing for milling material and creating a milled track behind the milling drum;
   a scraper blade located behind the milling drum;
   a drive unit arranged to adjust a height of the scraper blade relative to the milling drum;
   at least one height sensor arranged to detect a distance between at least one reference point on the scraper blade and milled material remaining in the milled track
   a conveyor to convey milled material out of the milling drum housing; and
   an operator input interface configured such that an operator can select either a first operating mode or a second operating mode, wherein:
   in the first operating mode the conveyor is activated such that the milled material is transported out of the milling drum housing while the scraper blade is lowered so that the scraper blade can skim over the milled track; and in the second operating mode milled material can remain at least partially in the milled track while the height of the scraper blade is adjusted above the milled track depending on the distance detected by the height sensor.

2. The machine of claim 1, wherein:
the second operating mode is configured to control the drive unit such that the detected distance between the at least one reference point and the milled material corresponds to a specified value or lies within a specified range.

3. The machine of claim 1, wherein:
the at least one height sensor is configured such that distances are detected between a plurality of reference points on the scraper blade and the milled material remaining in the milled track, the plurality of reference points being laterally spaced apart between left and right hand edges of the scraper blade.

4. The machine of claim 3, wherein:
the second operating mode is configured such that the height of the scraper blade is adjusted depending on a mean value of the distances detected at the plurality of reference points.

5. The machine of claim 3, wherein:
the second operating mode is configured such that the height of the scraper blade is adjusted depending on a smallest value of the distances detected at the plurality of reference points.

6. The machine of claim 3, wherein:
the second operating mode is configured such that the height of the scraper blade is adjusted depending on a largest value of the distances detected at the plurality of reference points.

7. The machine of claim 1, wherein:
the at least one height sensor is configured such that at least one reference point is located in a central region between left and right-hand edges of the scraper blade.

8. The machine of claim 1, wherein:
the at least one height sensor is configured such that the at least one reference point is located at a specified distance from a lateral edge of the scraper blade.

9. The machine of claim 1, wherein:
the second operating mode is configured to control the drive unit such that the scraper blade is raised when the distance detected by the at least one height sensor is smaller than a first specified lower limit value, and the scraper blade is lowered when the distance is greater than a second specified upper limit value, the upper limit value being at least as great as the lower limit value.

10. The machine of claim 1, wherein:
the at least one height sensor is arranged on a rear side of the scraper blade above a lower edge of the scraper blade.

11. The machine of claim 1, wherein:
the at least one height sensor is arranged movably between left and right-hand edges of the scraper blade.

12. The machine of claim 1, wherein:
the at least one height sensor is a contactless sensor.

13. The machine of claim 1, wherein:
the at least one height sensor is a tactile sensor.

14. The machine of claim 1, further comprising:
at least one of a controller and a regulator operably connected to the height sensor and the drive unit and configured such that the height of the scraper blade is adjusted depending on the distance detected by the height sensor.

15. The machine of claim 1, further comprising:
a control and regulation system operably connected to the height sensor and the drive unit and configured such that the height of the scraper blade is adjusted depending on the distance detected by the height sensor.

16. The machine of claim 1, wherein:
in the second operating mode the milled material remains completely in the milled track and the conveyor is deactivated.

17. A method of operating a self-propelled road milling machine, the machine including:
a machine frame;
a milling drum housing attached to the machine frame;
a milling drum arranged in the milling drum housing for milling material and creating a milled track behind the milling drum; and
a scraper blade located behind the milling drum;
the method comprising steps of:
(a) measuring a distance between at least one reference point on the scraper blade and milled material remaining in the milled track, the at least one reference point having a fixed relationship to a lower edge of the scraper blade; and
(b) adjusting the height of the scraper blade relative to the milling drum in response to the distance measured in step (a).

18. The method of claim 17, wherein the machine includes a conveyor for conveying milled material out of the milling drum housing, the method further comprising:
prior to step (a), switching off the conveyor.

19. The method of claim 17, wherein step (b) further comprises:
raising the scraper blade when the distance measured in step (a) is smaller than a lower limit value; and
lowering the scraper blade when the distance measured in step (a) is greater than an upper limit value, the upper limit value being equal to or greater than the lower limit value.

20. The method of claim 17, wherein:
in step (a), the at least one reference point includes a plurality of reference points, and step (a) includes measuring a distance between each of the reference points and the milled material remaining in the milled track.

21. The method of claim 20, wherein step (b) further comprises:
adjusting the height of the scraper blade based upon a mean value of the distances detected at the plurality of points.

22. The method of claim 20, wherein step (b) further comprises:
adjusting the height of the scraper blade based upon a smallest value of the distances detected at the plurality of points.

23. The method of claim 20, wherein step (b) further comprises:
adjusting the height of the scraper blade based upon a largest value of the distances detected at the plurality of points.

* * * * *